United States Patent [19]

Real et al.

[11] 4,080,239

[45] Mar. 21, 1978

[54] AUTOMATED LABEL APPLICATOR

[75] Inventors: Kenneth G. Real, Redmond; Larry P. Ellefson, Seattle, both of Wash.

[73] Assignee: Interface Mechanisms, Inc., Mountlake Terrace, Wash.

[21] Appl. No.: 794,259

[22] Filed: May 5, 1977

[51] Int. Cl.² ........................ B32B 31/00; B65H 25/00

[52] U.S. Cl. .................................... 156/361; 156/384; 156/542

[58] Field of Search ........................ 156/361, 540–542, 156/351, 468, 384

[56] References Cited

U.S. PATENT DOCUMENTS 3,447,992 6/1969 Allen et al. .......................... 156/361

*Primary Examiner*—David A. Simmons
*Attorney, Agent, or Firm*—Christensen, O'Connor, Garrison & Havelka

[57] ABSTRACT

An automated label applicator includes an elongated arm which is rotatable between a first position, in which the label applicator receives an adhesive-backed label as it is being separated from an elongated strip of label stock backing, and a second position, in which the label is removed from the label applicator by progressive engagement of the adhesive backing with a moving surface. In the label-receiving position, the label is directed between a first pin upstanding from the elongated arm, and a second pin supported for rotation about the first pin, by a spring arm which extends transversly from the first pin. The spring arm is normally biased against the second pin, but is deflected therefrom only when the elongated arm is in the label-receiving position. Upon initial rotation of the elongated arm toward the label-applying position, the spring arm is released to press the label against the second pin. A fixed pin coacting with a slot in a member supporting the second pin causes the member, and thus the second pin, to rotate about the first pin upon subsequent rotation of the elongated arm toward the label-applying position. When the elongated arm has reached a position intermediate the label-receiving and label-applying positions, the fixed pin exits from the slot and a cam-actuated rod mounted on the elongated arm enters a second slot in the member to fix the position of the member for subsequent rotation of the elongated arm toward the label-applying position. The thus-fixed position of the member establishes an orientation of the second pin with respect to the first pin, which accordingly orients the label in a position to be applied to the desired surface. Rotation of the elongated arm is provided by a stepping motor under control of a circuit which receives inputs from a label transport apparatus moving the elongated strip of label stock backing, from a sensor detecting when the elongated arm is in the label-receiving position, and from a sensor detecting proximity of the desired surface to the label-applying position. An arrangement is shown in which the elongated arm is also moved to a waiting position, spaced apart from a label-applying position, until such a time as the desired surface is in proximity to the label-applying position.

16 Claims, 8 Drawing Figures

Fig. 2.
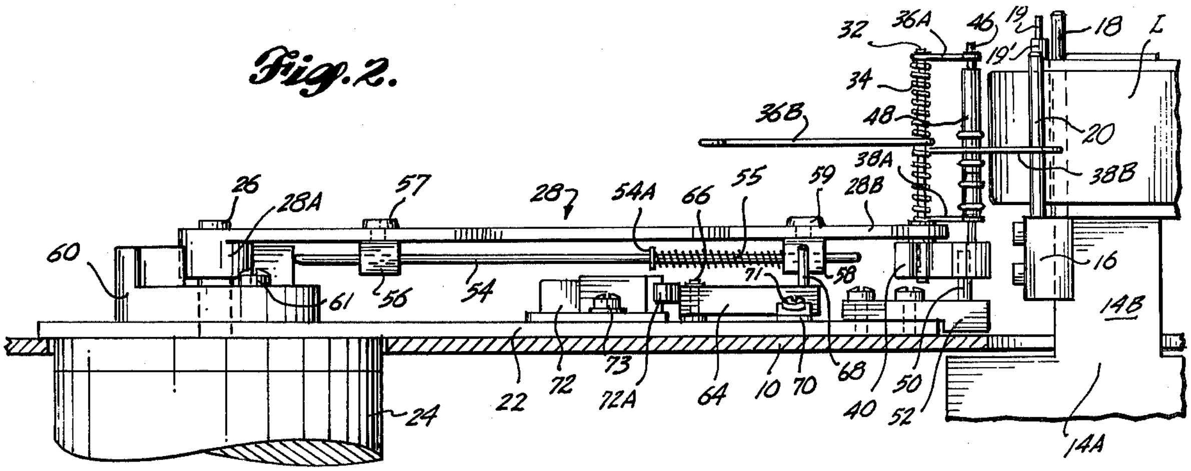
Fig. 3.
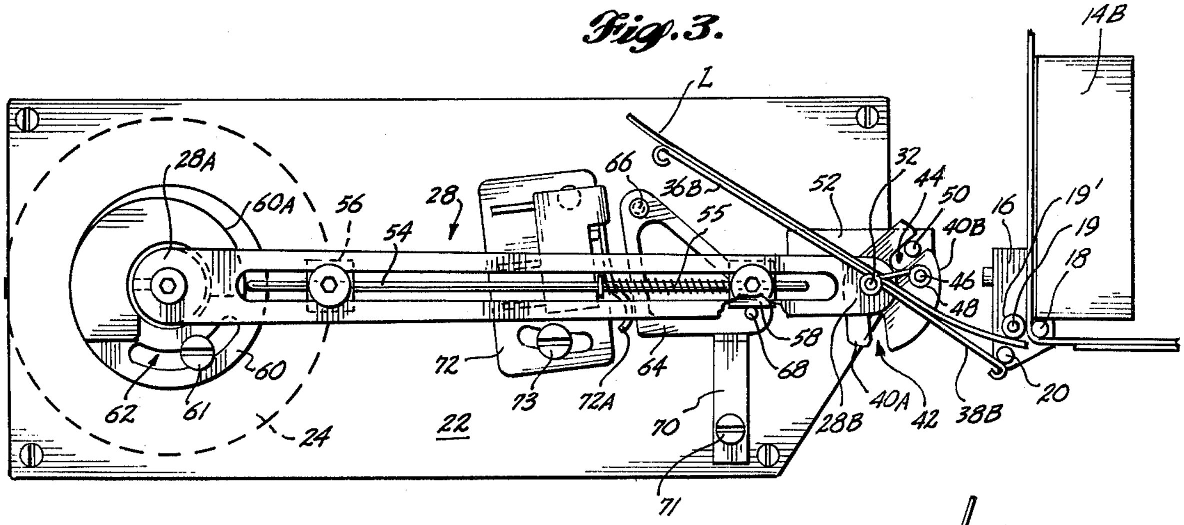
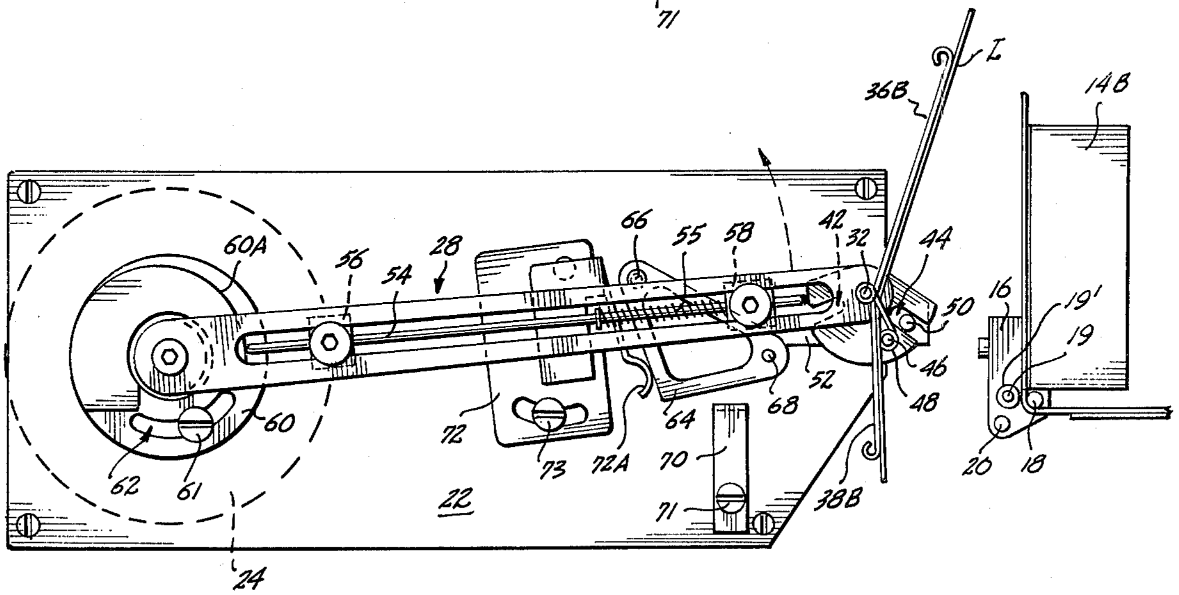
Fig. 4.

AUTOMATED LABEL APPLICATOR

BACKGROUND OF THE INVENTION

Mechanical impact printers are known to the prior art for imprinting a succession of characters, which may be expressed in the form of a bar code or the like, on a succession of labels which removably adhere to an elongated strip of label stock backing. In such printers, the elongated strip is moved under tension in a first direction past a print station where the characters are successively imprinted. The imprinted label stock may then be wound onto a take-up reel for subsequent dispensing of the imprinted labels. In certain cases, it is desired to remove the imprinted labels immediately after imprinting. To this end, the prior art has provided label stripping apparatus which may comprise a guide member having a projection or the like forming a label stripping surface around which the label stock is passed after imprinting. If the direction of label stock movement is changed by substantially 90° as it passes around the label stripping surface, and if the label stripping surface is formed by a projection or other sufficiently sharp surface, the individual labels will separate from the label stock backing at the label stripping surface and can thereafter be completely removed from the label stock backing by hand.

It can readily be appreciated that hand removal of the label and subsequent hand application of the thus-removed label to a desired surface are inefficient steps in an otherwise automated apparatus. Typically, the speed of label transport through the impact printer is much greater than the speed with which a human operator can remove labels and apply them to a surface. Therefore, the speed of label production in the case where the labels are to be applied immediately to a surface is limited to the speed of the human operator.

To increase the speed of label production in such cases, the prior art has proposed automated label applicators which receive the label as it is stripped from the label stock backing, which move the thus-received label into proximity to a surface to which the label is to be applied, and which apply the label to the surface. In one device known to the prior art, an anvil having a vacuum source coupled thereto is moved into proximity to the label stripping surface so that the label is sucked onto the anvil with the adhesive surface outward as the label is stripped from the stock backing. A pressurized air source may also be directed at the adhesive backing to assist in positioning the label on the anvil. Then, the anvil is moved to an applicating position in proximity to a surface to which the label is to be applied. By converting the vacuum source to a pressurized air source, the label is then blown off the anvil onto the desired surface. Although this device significantly increases the speed of label production, it is costly to implement inasmuch as both vacuum and pressurized air sources must be provided.

In another device known to the prior art, an endless belt is driven in proximity to the label stripping surface so that the adhesive backing of the label contacts the endless belt as the label is stripped from the label stock backing. The endless belt then transports the label to an intermediate position in proximity to an anvil which is provided with a vacuum source. The label is accordingly sucked from the endless belt onto the anvil. When the anvil is moved to an applicating position, the label is applied to a desired surface by converting the vacuum source to a pressurized air source. This device is subject to the disadvantages of, and is slower than, the first device mentioned above, and has proved to be unreliable in operation in that the label oftentimes cannot be removed from the endless belt.

It is therefore an object of this invention to provide an automated label applicator, preferably for use with impact printers of the type described, which has a speed of operation comparable to that of prior automated label applicators but which is simpler and cheaper to construct and more reliable in operation.

It is a further object of this invention to provide such an automated label applicator which does not require the use of pressurized air or vacuum sources.

SUMMARY OF THE INVENTION

These objects, and others that will be realized from a consideration of the following portion of the specification, are achieved by an automated label applicator which receives a label having an adhesive backing as the label is being separated from an elongated strip of label stock backing during planar movement of the label stock, in the direction of elongation of the strip, through a label stripping apparatus by a label transport apparatus. The automated label applicator moves the label in proximity to a surface to which the label is to be applied, and applies the label to the surface.

The automated label applicator comprises an elongated arm having first and second ends. A control means is operable in synchronism with the label transport apparatus for rotating the elongated arm, in a plane substantially parallel to the planar movement of the label stock backing, about the first end between a label-receiving position, in which the second end is in proximity to the label stripping apparatus, and a label-applying position in which the second end is in proximity to the surface to which the label is to be applied.

A first pin is secured in the second end of the elongated arm and extends transversely therefrom. Means support the second pin from the second end of the elongated arm for rotation about the first pin, with the second pin extending substantially parallel to the first pin. A spring means is received and retained on the first pin, with the spring means having a spring arm which extends transversely from the first pin and which is pressed against the second pin in assembly.

A cam means is cooperative with the means supporting the second pin for establishing a first orientation of the second pin with respect to the first pin when the elongated arm is in the label-receiving position, with the second pin being more proximate to the label stripping apparatus than the first pin when in the first orientation, and for causing rotation of the second pin about the first pin between the first orientation and a second orientation as the elongated arm is rotated between the label-receiving position and an intermediate position between the label-receiving position and the label-applying position.

Finally, means are provided for deflecting the spring arm away from the second pin only when the elongated arm is in the label-receiving position so that the label first contacts the spring arm as it is being separated from the elongated strip of label stock backing by the label stripping apparatus and is thereafter guided by this spring arm between the first and second pins upon further planar movement of the label stock backing, with the adhesive backing of the label facing the second pin. The label is thereafter pressed by the spring arm against the second pin upon initial rotation of the elongated arm toward the label-receiving position and is correctly positioned for application to the surface as the second pin rotates about the first pin from the first orientation to the second orientation upon further rotation of the elongated arm. The label is removed from between the first and second pins when the elongated arm is in the label-applying position by progressive engagement of the adhesive backing of the label with the surface as that surface is moved relative to the label-applying position.

BRIEF DESCRIPTION OF THE DRAWINGS

The invention can best be understood by reference to the following portion of the specification, taken in conjunction with the accompanying drawings, in which:

FIG. 2 is a side elevation view corresponding to FIG. 1;

FIG. 3 is a top plan view generally corresponding to FIG. 1 but illustrating a label as received in the automated label applicator;

FIG. 4 is a top plan view of the automated label applicator in a first position between the label-receiving position and a label-applying position;

DESCRIPTION OF A PREFERRED EMBODIMENT

Figure 1:
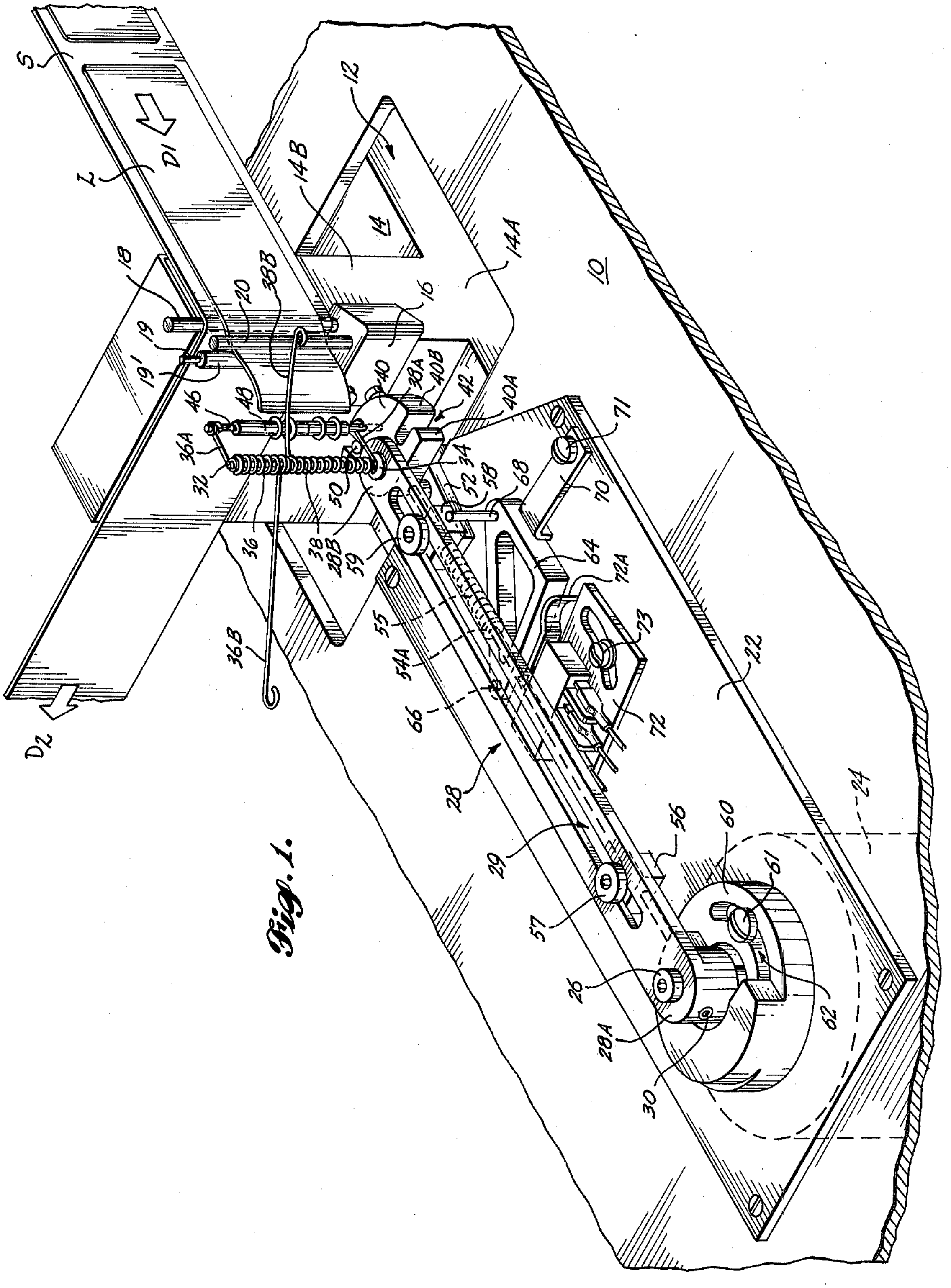
FIG. 1 is a pictorial view of a portion of a transport apparatus for an elongated strip of label stock backing, of a label stripping apparatus for removing labels from the label stock backing, and of the automated label applicator of the present invention in a label-receiving position.

Now referring to FIGS. 1–3, a label transport apparatus forming part of an impact printer includes a mounting plate 10 having an opening 12 extending therethrough. A member 14 has a base portion 14A secured below mounting plate 10 and a support portion 14B extending through opening 12 to project above mounting plate 10. A label stripping apparatus is secured to the member 14, the label stripping apparatus including a base 16 which is attached to support portion 14B, and a label stripping pin 18 extending upwardly from base 16.

The label transport apparatus includes means for providing planar movement of an elongated strip of label stock backing S from a supply position (to the right in FIG. 1) in a first direction D1 to the label stripping pin 18, around the label stripping pin 18, and thence in a second direction D2, displaced substantially 90° from the first direction D1, to a take-up position (to the left in FIG. 1). Located on the label stock backing S are a plurality of adhesive-backed labels L. As is seen in FIG. 1, each label L is separated or stripped from the label stock backing S as the backing S is moved around the label stripping pin 18.

In practice, the member 14 may include a hammer assembly for impacting a portion of the label stock backing S, the label L, and an ink ribbon, not illustrated, against a raised element on a continuously rotating print wheel to thereby imprint a character on the label L. Further details regarding such a hammer assembly, as well as the details regarding the construction of a typical impact printer known to the prior art, can be found in U.S.P at No. 3,998,154, "*HAMMER ASSEMBLY FOR USE IN IMPACT PRINTERS*", *Real et al., Dec.* 21, 1976, which is expressly incorporated by reference herein.

Also upstanding from base 16 in a direction substantially parallel to that of label stripping pin 18 are pins 19 and 20. As best seen in FIG. 3, the pin 19 is positioned rearwardly of the label stripping pin 18 (in the second direction D2) and has a plurality of rollers 19' located thereon, and the pin 20 is positioned forwardly of the label stripping pin 18 so that the label L passes between pin 19 and pin 20 as it is stripped from the label stock backing S.

The label applicator includes a generally rectangular plate 22 which is secured to the mounting plate 10 at a location so that the label applicator can receive the label L as it is stripped from the backing S (to the left of member 14 in FIGS. 1–3). The plate 22 supports a DC stepping motor 24, of a type well known to the art, which extends through an opening in mounting plate 10 and which is located substantially below mounting plate 10 in assembly. The DC stepping motor 24 has a rotatable shaft 26 projecting above plate 22 to which is secured, by means of a set screw 30, a first end 28A of an elongated arm 28 which is bifurcated intermediate the first end 28A and a second end 28B to define an elongated slot 29. A pin 32 is rotatably secured in the second end 28B of the arm 28 by a bushing 34 and extends both above and below arm 28 in a direction substantially transverse to the direction of elongation thereof. A pair of coil springs 36, 38 are received on the portion of pin 32 extending above arm 28. Springs 36, 38 have respective spring arms 36A, 36B, and 38A, 38B, at their ends. In assembly, spring arm 38A is located adjacent arm 28, spring arm 36A is located at the top of pin 32, and spring arms 36B, 38B are located intermediate spring arms 36A and 38A. Spring arms 36B, 38B extend in opposite directions from pin 32 when spring arms 36A and 38A are substantially aligned and extend in the same direction from pin 32. As best seen in FIG. 2, spring arms 36B and 38B also extend in a plane substantially parallel to arm 28.

Fixedly supported on the portion of pin 32 which extends below arm 28 is a member 40, in the shape of a partial disc, which has a first semi-cylindrical surface 40A and a second semi-cylindrical surface 40B, with the radius of surface 40B being slightly greater than the radius of surface 40A. A first slot 42 is formed in the disc 40 between surfaces 40A and 40B, and a second slot 44 is formed in disc 40 at a location in surface 40B. Upstanding from and supported by disc 40 is a pin 46 which extends substantially parallel and coextensive with pin 32. The spring arms 36A, 38A are secured to respective upper and lower ends of the pin 46, and a plurality of rollers 48 are located on pin 46 intermediate spring arms 36A and 38A.

As illustrated in FIGS. 1–3, the arm 28 is in a position for receiving the label L as it is stripped and is substantially parallel to but slightly offset from the first direction D1. In this position, a cam pin 50, secured in and upstanding from a base 52 which is attached to the plate 22, is received in the slot 44 to maintain the disc 40 in the position illustrated in FIG. 3. As a result, the force transmitted through the spring arms 36A, 38A causes the spring arm 38B to be pressed against the pin 20 and deflected thereby from pin 46 and the spring arm 36B to be substantially aligned with spring arm 38B. As will be appreciated, the pin 50 and the slot 44 co-act to form a cam means for controlling the orientation of the pin 46 with respect to pin 32 through disc 40.

A rod 54 is supported below the arm 28 by first and second blocks 56, 58 which are secured to the underside of arm 28 by screws 57, 59 passing through the slot 29. Each of the blocks 56, 58 has an aperture extending therethrough so that the rod 54 is capable of translative movement along the direction of elongation of arm 28. A cam member 60 is adjustably secured to the upper surface of plate 22 by a screw 61 passing through a slot 62, with cam member 60 being located in a position surrounding the shaft 26 of the stepping motor 24. The cam member 60 includes cam surface 60A of revolution, in this embodiment comprising a spiral surface of increasing radius from a position aligned with the label-receiving position of arm 28 to a position substantially aligned with the label-receiving applying position of arm 28 to a position substantially aligned with the label-applying position of arm 28. An end of the rod 54 is resiliently pressed against cam surface 60A by virtue of the force exerted on rod 54 by a compression spring 55 surrounding rod 54 and bearing on a portion of block 58 and a shoulder 54A on rod 54. In the receiving position illustrated in FIG. 3, the other end of the rod 54 is spaced from the pin 32 by a distance slightly greater than the radius of surface 40A of disc 40.

An actuator 64 is rotatably supported on a pin 66 upstanding from plate 22, with the actuator 64 having upstanding therefrom a pin 68 which is positioned to engage a portion of the block 58 on the arm 28. In the receiving position illustrated in FIG. 1–3, the block 58 has engaged the pin 68 to rotate the actuator 64 to a position where it abuts a stop 70 adjustably secured to the plate 22 by a screw 71. It will be recognized that adjustment of the position of stop 70 accordingly provides adjustment of the receiving position of the arm 28. When in this receiving position, the actuator 64 also engages and depresses an actuating arm 72A of a microswitch 72 which is adjustably secured to the plate 22 by a screw 73.

Figure 8:
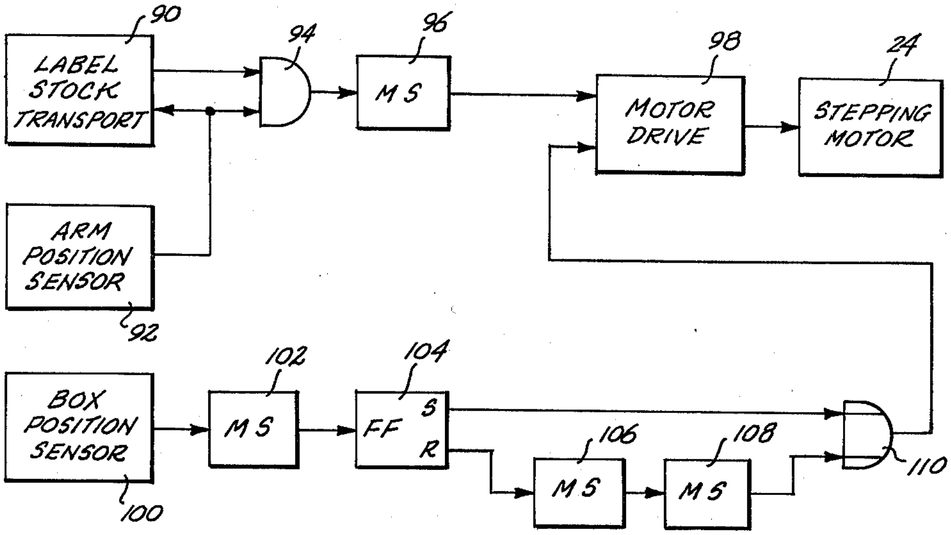
FIG. 8 is a block diagram of a control means for the automated label applicator.
Figure 6:
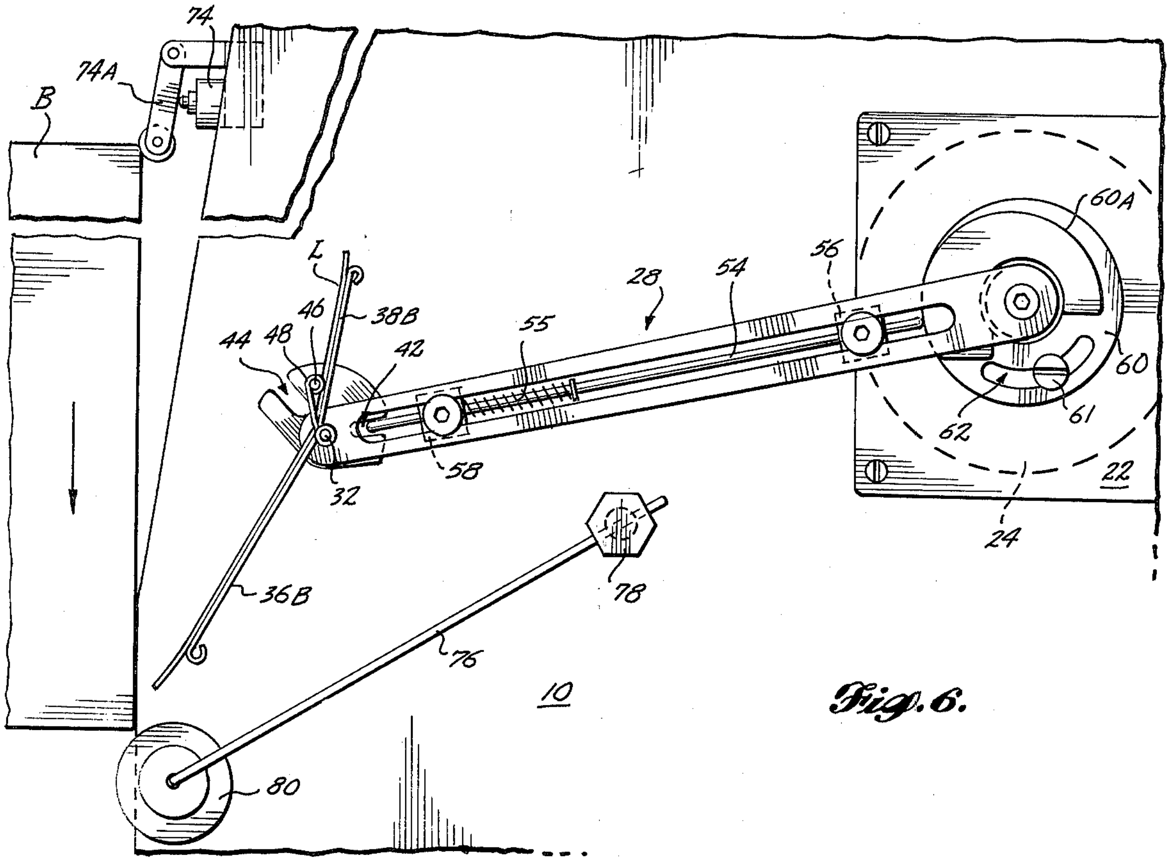
FIG. 6 is a top plan view of the automated label applicator in a waiting position.

With reference also to the block diagram of a typical control means for the label applicator as shown in FIG. 8, the microswitch 72 forms part of an arm position sensor 92 which provides an output signal to a label stock transport 90 and to an AND gate 94 when actuating arm 72A is depressed as illustrated in FIG. 3 to thereby denote that the arm 28 is in the receiving position. The label stock transport 90 includes the label transport apparatus previously described and suitable sensors and control circuits, not illustrated, for causing the label stock backing S to be advanced on a label-by-label basis from the supply position to the take-up position. As the label stock backing S is moved by the label transport apparatus, the label L is stripped therefrom and the leading edge thereof passes between pins 19 and 20, with the adhesive backing of the label L riding over the rollers 19′ on pin 19. The leading edge of the label L comes into contact with spring arm 38B, then translates along spring arm 38B and spring arm 36B until it is driven to the position illustrated in FIG. 3 wherein only the trailing edge of the label L is in contact with the label stock backing S. At this time, which may be determined by moving the label stock backing S for a predetermined increment of time at a constant rate, the label stock transport 90 stops movement of the label stock backing S and provides an output signal to AND gate 94 which thereupon provides a signal to a monostable multi-vibrator 96. In response, multivibrator 96 provides an output signal for a predetermined period of time thereafter to a first input of a motor drive circuit 98 which is response controls the stepping motor 24 to rotate the shaft 26 thereof in a counterclockwise direction so that the arm 28 may be rotated to a waiting position (FIG. 6). The predetermined time period of multivibrator 96 is chosen to be sufficient to allow the motor drive circuit 98 to control the stepping motor 24 to drive the arm 28 to its waiting position.

With reference now to FIG. 4, the initial rotation of arm 28 in a counterclockwise direction causes the disc 40 and pin 32 to rotate in a clockwise direction about the axis of pin 32 due to the engagement of pin 50 with slot 44, in a manner similar to that of the well known Geneva gear. Rotation of disc 40 causes the spring arm 38B to first move out of engagement with pin 20 and to thereafter press a portion of the label L against the rollers 48 to grip the label L in the label applicator and to remove the trailing edge thereof from the label stock backing S. Further rotation of arm 28 in a counterclockwise direction results in additional rotation of disc 40 and pin 32 due to the continued engagement of pin 50 and slot 44. As disc 40 and pin 32 rotate, pin 46 rotates about pin 32 so that spring arms 38B and 36B also rotate due to the forces exerted through pin 46 and spring arms 36A, 38A. At the position of rotation illustrated in FIG. 4, it will be seen that block 58 has disengaged from pin 68, thereby removing the pressure exerted on actuating arm 62A by actuator 64 so that microswitch 72 is de-actuated. At this time, the signal to AND gate 94 from arm position sensor 92 is terminated. It will also be noted that the increasing radius of the spiral cam surface 60A has caused the rod 54 to move outwardly against the pressure of the spring 55 so that the end of rod 54 is closely adjacent the surface 40A of disc 40.

Upon further rotation of arm 28 in a counterclockwise direction, rod 54 is moved by cam surface 60A to a position wherein the end of rod 54 is located at a distance from pin 32 slightly less than the radius of surface 40B. At this intermediate position of arm 28, disc 40 has been rotated so that rod 54 is substantially aligned with slot 42 and therefore the end of rod 54 abuts the portion of slot 42 adjacent to surface 40B. Also at this intermediate position, pin 50 is exiting from slot 44. As a result, the orientation of disc 40 with respect to the arm 28, and thus the orientation of pin 46 with respect to pin 32, is fixed, with the orientation being chosen to be that which is desirable to apply the label L to a surface as hereinafter described.

Figure 5:
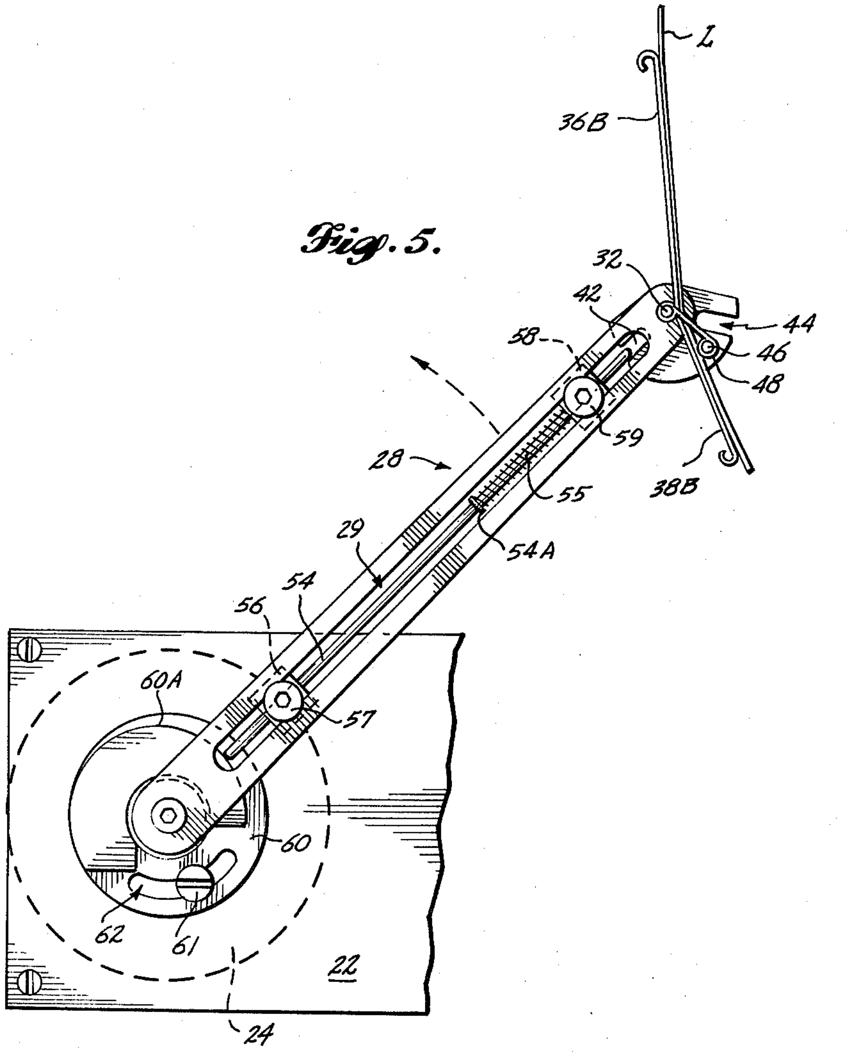
FIG. 5 is a top plan view of the automated label applicator in a second position between the label-receiving position and the label-applying position.

Continued rotation of the arm 28 in a counterclockwise direction causes the end of the rod 54 to enter the slot 42, as illustrated in FIG. 5, so that the disc 40 may be maintained at its desired orientation.

Figure 7:
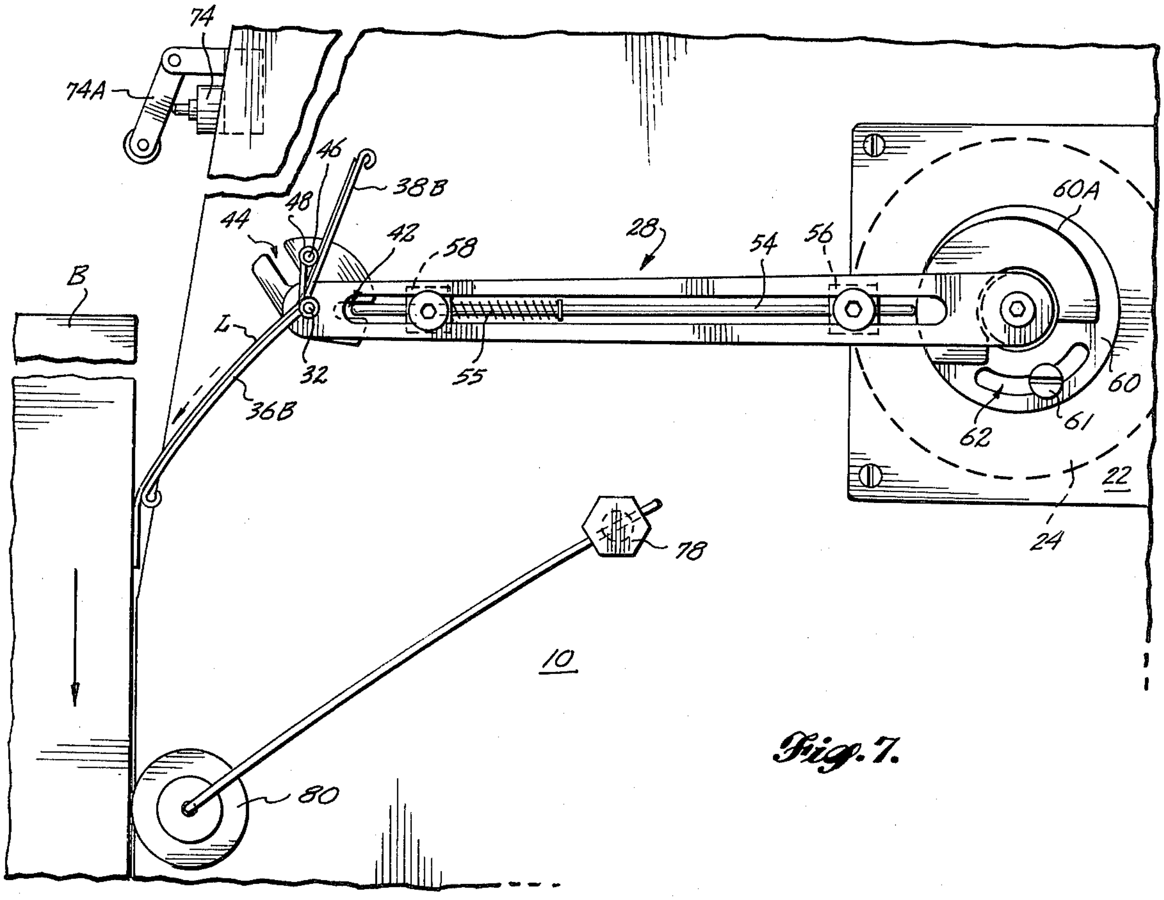
FIG. 7 is a top plan view of the automated label applicator in the label-applying position.

Now referring to FIG. 6, the arm 28 has been rotated fully counterclockwise to its waiting position and the multivibrator 96 has terminated its output signal so that the motor drive circuit 98 controls the stepping motor 24 to stop rotation of its shaft 26. In the waiting position, the end of rod 54 is received within slot 42, and spring arm 36B is disposed so that neither it nor the leading edge of the label L extends over the edge of the mounting plate 10. In the embodiment shown, the label L is to be applied to a surface of a box B which is being transported in a direction generally parallel to the direction of elongation of the spring arms 36B, 38B (and thus of the label L) by a conveyor apparatus, not illustrated. As can be noted, the surface to which the label L is to be applied is adjacent the edge of the mounting plate 10. A switch 74 having an actuating arm 74A is affixed to the label transport apparatus at a location adjacent the edge of the mounting plate 10 but "upstream" of the waiting position of the arm 28 and forms part of a box position sensor 100 (FIG. 8). The actuating arm 74A is depressed upon engagement with the leading edge of the box B. As the box B proceeds along the conveyor apparatus in the direction of the arrow in FIG. 6, the actuating arm 74A comes out of engagement with the trailing edge of the box B. In response, the box position sensor 100 provides an output signal to a monostable multivibrator 102 which provides an output signal for a predetermined period of time to a flip-flop 104. In response, the flip-flop 104 is placed into a first state whereby it provides an output signal on its set output to an OR gate 110 which provides a signal to a second input of motor drive circuit 98. In response, the motor drive circuit 98 controls the stepping motor 24 so that the shaft 26 thereof is rotated in a clockwise direction. As a result, the arm 28 also rotates in a clockwise direction, to an applying position as illustrated in FIG. 7. The predetermined time period of multivibrator 102 is chosen to be sufficient to allow motor drive circuit 98 to control the stepping motor 24 to drive the arm 28 to its applying position.

As the arm 28 is being driven to its applying position, the leading edge of the label L comes into contact with the surface of the box B. Further rotation of the arm 28 in a clockwise direction causes the end of the spring arm 36B to press a portion of the label L against the surface of the box B. The label L adheres to the box surface by virtue of its adhesive backing. When the arm 28 has reached and been stopped in its applying position (by virtue of the termination of the signal from multivibrator 102), continued movement of the box B on the conveyor apparatus removes the label L from the spring arms 36B and 38B, with rollers 48 facilitating this removal and with the end of spring arm 36B continuing to press a portion of the label L against the box surface. If desired, the thus-applied label may be smoothed on the box surface by a roller 80 rotatably supported on the end of a spring arm 76 which is secured to the mounting plate 10 by a support 78, with the roller 80 being located "downstream" of the applying and waiting positions of the arm 28 and extending partially over the edge of the mounting plate 10.

Upon termination of the output signal from multivibrator 102, flip-flop 104 switches to its second state wherein it provides an output signal to a monostable multivibrator 106, which may be of a type that provides an output signal at a predetermined period of time after the application of an input signal thereto. The predetermined time period of the multivibrator 106 is chosen to be slightly longer than the time required for the trailing edge of the box B to clear the applying position of the arm 28. After this predetermined time period, multivibrator 106 provides an output signal to a monostable multivibrator 108 which in response provides an output signal through OR gate 110 to the second input of motor drive circuit 98. In response, motor drive circuit 98 controls the stepping motor 24 to rotate the arm 28 back to its receiving position. As will be appreciated, the predetermined time period of multivibrator 108 is chosen to be sufficient to allow motor drive circuit 98 to control the stepping motor 24 to return the arm 28 to its receiving position.

During this clockwise rotation of arm 28, the rod 54 is withdrawn from the slot 42 to unlock the disc 40, and the pin 50 comes into engagement with the slot 44 to rotate the disc 40 back to the position illustrated in FIGS. 1–3. Also, the actuator 64 is rotated by engagement of block 58 in pin 68 to again depress the actuating arm 72A, thereby actuating the microswitch 72 to re-establish the output signal from arm position sensor 92. In response, label stock transport 90 again advances the label stock backing S so that a successive label is received into the label applicator, and the label application operation just described is repeated.

While the invention has been described with reference to a preferred embodiment, it is to be clearly understood by those skilled in the art that the invention is not limited thereto, but rather that the scope of the invention is intended to be interpreted only in conjunction with the appended claims. As one example, it is not necessary that the surface to which the label L is to be applied (such as the surface of the box B in FIGS. 6 and 7) be moved continuously relative to the label-applying position. The surface to which the label L is to be applied can be stationary as the arm 28 is related to the label-applying position, and thereafter can be moved to withdraw the label L from the label applicator. As another example, the cam means formed by pin 50 and slot 44 may also include an additional pin upstanding from the plate 22 which coacts with an additional radial slot, similar to slot 44 in the disc 40. The additional pin may be located so as to enter the additional radial slot as pin 50 exits from slot 44 so that additional rotation of disc 40 in either a clockwise or counterclockwise direction can be obtained to achieve a desired orientation of disc 40 with respect to the arm 28, and thus a desired orientation of pin 46 with respect to pin 32.

What is claimed is:

1. An automated label applicator, for receiving a label having an adhesive backing as the label is being separated from an elongated strip of label stock backing during planar movement of the label stock backing in the direction of elongation of the strip through a label stripping apparatus by a label transport apparatus, for moving the label into proximity to a surface to which the label is to be applied, and for applying the label to the surface, said automated label applicator comprising:

a. an elongated arm having first and second ends;

b. control means operable in synchronism with the label transport apparatus for rotating said elongated arm, in a plane substantially parallel to the planar movement of the label stock backing, about said first end between a label-receiving position, in which said second end is in proximity to the label stripping apparatus, and a label-applying position, in which said second end is in proximity to the surface to which the label is to be applied;

c. a first pin secured in said second end of said elongated arm and extending transversely therefrom;

d. a second pin;

e. means supporting said second pin from said second end of said elongated arm for rotation about said first pin, said second pin extending substantially parallel to said first pin;

f. spring means received and retained on said first pin, said spring means having a spring arm which extends transversely from said first pin and which is pressed against said second pin in assembly;

g. cam means cooperative with said supporting means for establishing a first orientation of said second pin with respect to said first pin when said elongated arm is in said label-receiving position, said second pin being more proximate to the label stripping apparatus than said first pin when in said first orientation, and for causing rotation of said second pin about first pin between said first orientation and a second orientation as said elongated arm is rotated between said label-receiving position and an intermediate position between said label-receiving position and said label-applying position, and;

h. means for deflecting said spring arm away from said second pin only when said elongated arm is in said label-receiving position, so that the label first contacts said spring arm as it is being separated from the elongated strip of label stock backing by the label stripping apparatus and is thereafter guided by said spring arm between said first and said second pins upon further planar movement of the label stock backing, with the adhesive backing thereof facing said second pin, whereby the label is thereafter pressed by said spring arm against said second pin upon initial rotation of said elongated arm toward said label-receiving positon, whereby the label is correctly positioned for application to the surface as said second pin rotates about said first pin from said first orientation to said second orientation upon further rotation of said elongated arm, and whereby the label is removed from between said first and said second pins when said elongated arm is in said label-applying position by progressive engagement of the adhesive backing of the label with the surface as that surface is moved relative to said label-applying position.

2. An automated label applicator as recited in claim 1, wherein said supporting means includes a member rotatable on said elongated arm about an axis aligned with said first pin, and wherein said second pin is secured to said member at a location spaced apart from said axis.

3. An automated label applicator as recited in claim 2, wherein said first pin extends is rotatably secured in said second end of said elongated arm, and wherein said member is fixedly secured to said first pin and rotatable therewith.

4. An automated label applicator as recited in claim 3, wherein said first pin extends above and below said elongated arm, and wherein said member is fixedly secured to said first pin below said elongated arm, with said second pin upstanding from said member.

5. An automated label applicator as recited in claim 2, wherein said cam means includes at least one radial slot extending into said member toward said axis, and at least one third pin fixedly secured in proximity to said second end of said elongated arm when in said label-receiving position, said third pin extending substantially parallel to said first and said second pins and being located so as to be received in said radial slot only for positions of said elongated arm between said label-receiving and said intermediate positions thereof.

6. An automated label applicator as recited in claim 5, further comprising means for maintaining said second pin at said second orientation for rotation of said elongated arm between said intermediate position and said label-applying position, said maintaining means comprising: a second radial slot extending into said member toward said axis; a rod supported from said elongated arm for translative movement therealong; said second radial slot being located in said member so as to be aligned with and facing said rod when said elongated arm is in said intermediate position; and, means for moving a first end of said rod into second radial slot during rotation of said arm between said intermediate position and said label-applying position.

7. An automated label applicator as recited in claim 6, wherein said means for moving said rod includes: a cam member fixedly located in proximity to said first end of said elongated arm, said cam member including a partial cam surface of revolution about said first end; and resilient means urging a second end of said rod against said cam surface; the radius of said cam surface between said label-receiving and said intermediate positions of said elongated arm, being less than that necessary to move said first end of said rod into said second radial slot, and, between said intermediate and label-applying surfaces of said elongated arm, being equal to or greater than that necessary to move the end of the rod into said second radial slot.

8. An automated label applicator as recited in claim 7, wherein said cam surface comprises a spiral of increasing radius from a radius in alignment with said elongated arm when in said label-receiving position to a radius substantially in alignment with said elongated arm when in said label-applying position.

9. An automated label applicator as recited in claim 1, further comprising means for maintaining said second pin in said second orientation for rotation of said elongated arm between said intermediate and said label-applying positions.

10. An automated label applicator as recited in claim 1, further comprising roller means received and retained on said second pin.

11. An automated label applicator as recited in claim 1, wherein said deflecting means includes a pin fixedly secured in proximity to said second end of said elongated arm when in said label-applying position, said pin extending substantially parallel to said first and second pins, said pin being located so as to be engaged by said spring arm only as said elongated arm is rotated into and from said label-receiving position.

12. An automated label applicator as recited in claim 1, wherein said spring means comprises a coil spring having a central portion which is received on said first pin, said central portion terminating, at one end, in said spring arm and, at the other end, in a spring arm which also extends transversely from said first pin and which is secured to said second pin.

13. An automated label applicator as recited in claim 1, wherein said spring means has a second spring arm which extends transversely from said first pin but in a direction substantially opposite to that of said spring arm, said second spring arm being operative to press the label against the surface to which the label is to be applied when said elongated arm is in said label-applying position.

14. An automated label applicator as recited in claim 13, wherein said spring means comprises first and second coil springs, each having a central portion which is received on said first pin, said central portion of said first coil spring terminating, at one end, in said spring arm and, at the other end, in a spring arm which also extends transversely from said first pin and which is secured to said second pin, said central portion of said second coil spring terminating, at one end, in said second spring arm and, at the other end, in a spring arm which also extends transversely from said first pin and which is secured to said second pin.

15. An automated label applicator as recited in claim 1, wherein said control means includes:

a. first means for providing an output signal when said elongated arm is in said label-receiving position;

b. motor means having a rotatable shaft coupled to said first end of said elongated arm for rotating said arm in first and second, opposite directions;

c. second means providing an output signal when the label transport apparatus has moved the label into said label applicator;

d. third means responsive to concurrence of said output signals from said first and second means for controlling said motor means to rotate said elongated arm in said first direction from said label-receiving position to said label-applying position;

3. forth means providing an output signal when the moving surface to which the label is to be applied has moved past said label-applying position; and f. fifth means responsive to the output signal from said fourth means for controlling said motor means to rotate said elongated arm in said second direction from said label-applying position to said label-receiving position.

16. An automated label applicator as recited in claim 1, wherein said control means includes:

a. first means providing an output signal wherein said elongated arm is in said label-receiving position;

b. motor means having a rotatable shaft which is coupled to said first end of said elongated arm for rotating said elongated arm in first and second, opposite directions;

c. second means providing an output signal when the label transport apparatus has moved the label into said label applicator;

d. third means responsive to concurrence of said output signals from said first and second means for controlling said motor means to rotate said elongated arm in said first direction from said label-receiving position to said label-applying position, and past said label-applying position to a waiting position;

e. fourth means providing an output signal when the surface to which the label is to be applied is in proximity to said label-applying position;

f. fifth means responsive to said output signal from said fourth means for controlling said motor means to rotate said elongated arm in said second direction from said waiting position to said label-applying position; and g. sixth means responsive to the output signal from said fourth means for controlling said motor means, at a predetermined time after the production of said output signal, to rotate said elongated arm in said second direction from said label-applying position to said label-receiving position.

* * * * *

UNITED STATES PATENT AND TRADEMARK OFFICE
CERTIFICATE OF CORRECTION

PATENT NO. : 4,080,239

DATED : March 21, 1978

INVENTOR(S) : Kenneth G. Real et al.

It is certified that error appears in the above-identified patent and that said Letters Patent are hereby corrected as shown below:

Abstract, first column, last line: "versly" is changed to —versely—.

Column 6, line 6: "is" is changed to —in—.

Column 10, line 4: —said— is inserted before "second".

Column 11, line 21: "3. forth" is changed to —e. fourth—.

Signed and Sealed this

*Fifteenth* Day of *August 1978*

[SEAL]

*Attest:*

RUTH C. MASON
*Attesting Officer*

DONALD W. BANNER
*Commissioner of Patents and Trademarks*